(12) United States Patent
Parriaux et al.

(10) Patent No.: US 7,718,952 B2
(45) Date of Patent: May 18, 2010

(54) INFORMATION CARRIER

(75) Inventors: Olivier Parriaux, Saint-Etienne (FR); Alexander V. Tishchenko, Saint-Etienne (FR); Reinhold Mutschler, Villingen-Schwenningen (DE)

(73) Assignee: Sick Stegmann GmbH, Donaueschingen (DE)

( * ) Notice: Subject to any disclaimer, the term of this patent is extended or adjusted under 35 U.S.C. 154(b) by 365 days.

(21) Appl. No.: 11/636,715

(22) Filed: Dec. 11, 2006

(65) Prior Publication Data

US 2007/0147221 A1 Jun. 28, 2007

(30) Foreign Application Priority Data

Dec. 23, 2005 (DE) .................. 10 2005 061 987

(51) Int. Cl.
*G01D 5/36* (2006.01)

(52) U.S. Cl. ............... 250/237 G; 250/231.13; 250/231.14; 250/231.15; 250/231.16; 250/231.17

(58) Field of Classification Search ................ None
See application file for complete search history.

(56) References Cited

U.S. PATENT DOCUMENTS

| | | | |
|---|---|---|---|
| 4,556,790 A * | 12/1985 | Glass et al. ............ | 257/431 |
| 4,893,299 A | 1/1990 | Humberstone et al. | |
| 5,559,787 A * | 9/1996 | Nomoto ............... | 369/112.02 |

(Continued)

FOREIGN PATENT DOCUMENTS

DE 3638838 A1 5/1988

(Continued)

OTHER PUBLICATIONS

Pigeon et al., "Identity of Long-Range Surface Plasmons Along Asymmetric Structures and their Potential for Reractometric Sensors." Journal of Applied Physics, v.90(2) pp. 852-859 (2001).

(Continued)

*Primary Examiner*—Wayne R Young
*Assistant Examiner*—Carl Adams
(74) *Attorney, Agent, or Firm*—The Nath Law Group; Jerald L. Meyer; Derek Richmond

(57) ABSTRACT

The invention relates to an information carrier (10), having a metal layer (40) with at least one track (14) in which marks (20) are disposed, which can be detected by means of light of a central wavelength ($\lambda$) which is emitted by a light source (30) and which is incident upon the information carrier (10) at an angle ($\theta_i$), and from which the position of the information carrier (10) can be derived, wherein the marks (20) are formed by areas (25) which are structured at least by first structures (22) of a lattice period ($\Lambda$) which are disposed on the back side (40b) of the metal layer (40) and/or on the front side (40a) of the metal layer (40), and wherein the lattice period ($\Lambda$) of the first structures (22) satisfies the equation $\Lambda=\lambda/(n_p^*-\sin(\Theta_i))$ or $\Lambda=\lambda/(n_p^*+\sin(\Theta_i))$, wherein $\lambda$ is the central wavelength of the used light, $\Theta_i$ is the angle at which the light of the light source (30) is incident upon the information carrier (10) and $n_p^*$ is the effective index of a plasmon mode along the metal layer (40).

23 Claims, 9 Drawing Sheets

U.S. PATENT DOCUMENTS

Figure 1A:
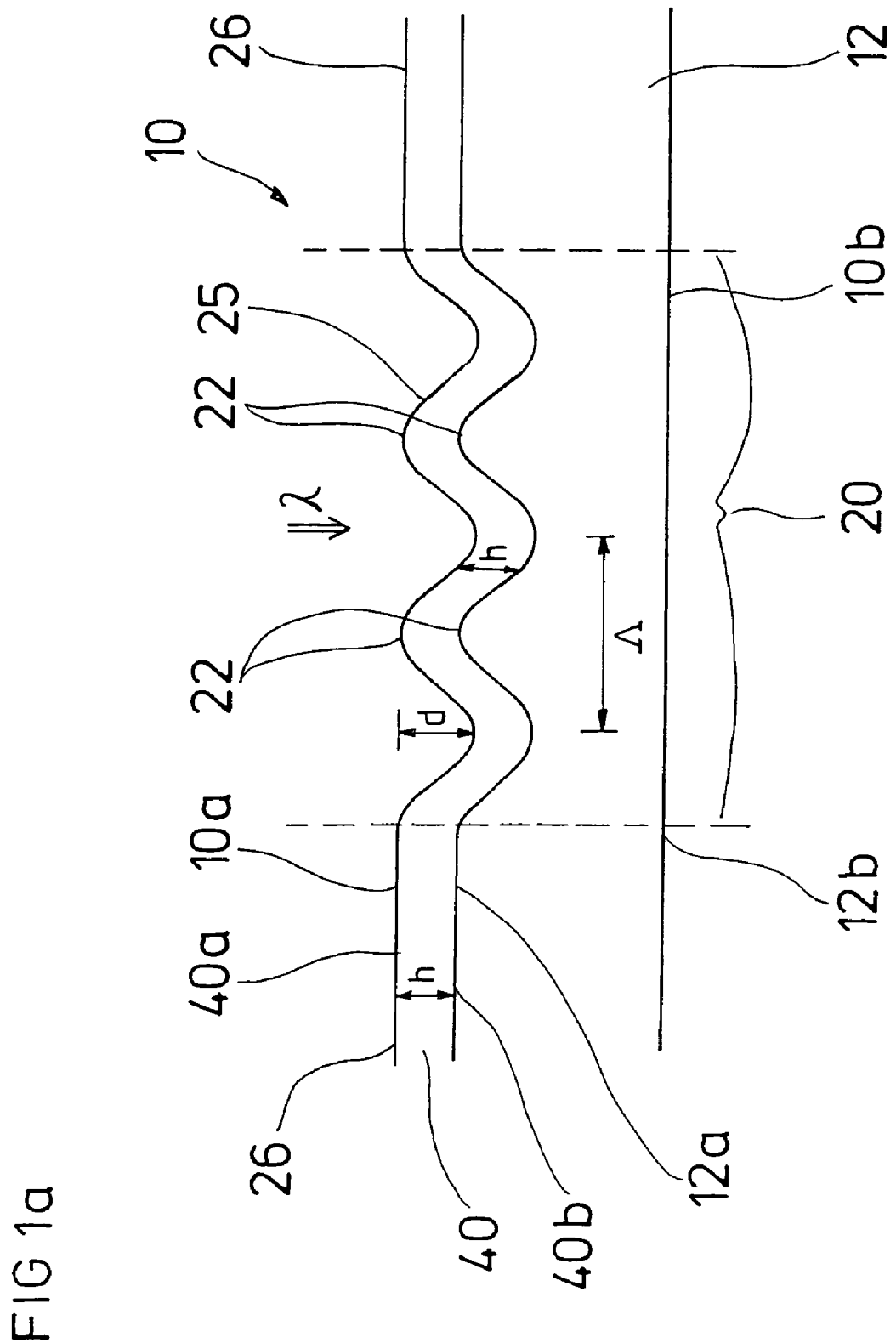

| | | | |
|---|---|---|---|
| 5,602,819 A * | 2/1997 | Inagaki et al. | 369/275.4 |
| 5,716,761 A * | 2/1998 | Iida et al. | 430/321 |
| 6,309,802 B1 * | 10/2001 | Bar-Gadda | 430/321 |
| 2002/0041549 A1 * | 4/2002 | Obara | 369/53.18 |
| 2004/0161575 A1 | 8/2004 | Hwang et al. | |
| 2006/0180750 A1 * | 8/2006 | Gollier et al. | 250/227.11 |

FOREIGN PATENT DOCUMENTS

| | | |
|---|---|---|
| DE | 103 03 038 A1 | 8/2004 |
| DE | 10 2004011 146 A1 | 8/2005 |
| EP | 0 685 708 | 12/1995 |
| WO | 2005/103771 A1 | 11/2005 |

OTHER PUBLICATIONS

Bonod et al., "Resonant Optical Transmission Through Thin Metallic Films With and Without Holes." Optics Express, v. 11(5) pp. 482-490 (2003).

Pigeon, F., et al., Identity of long-range surface plasmons along asymmetric structures and their potential for refractometric sensors, *Journal of Applied Physics*, vol. 90, No. 2, pp. 852-859, (Jul. 15, 2001).

* cited by examiner

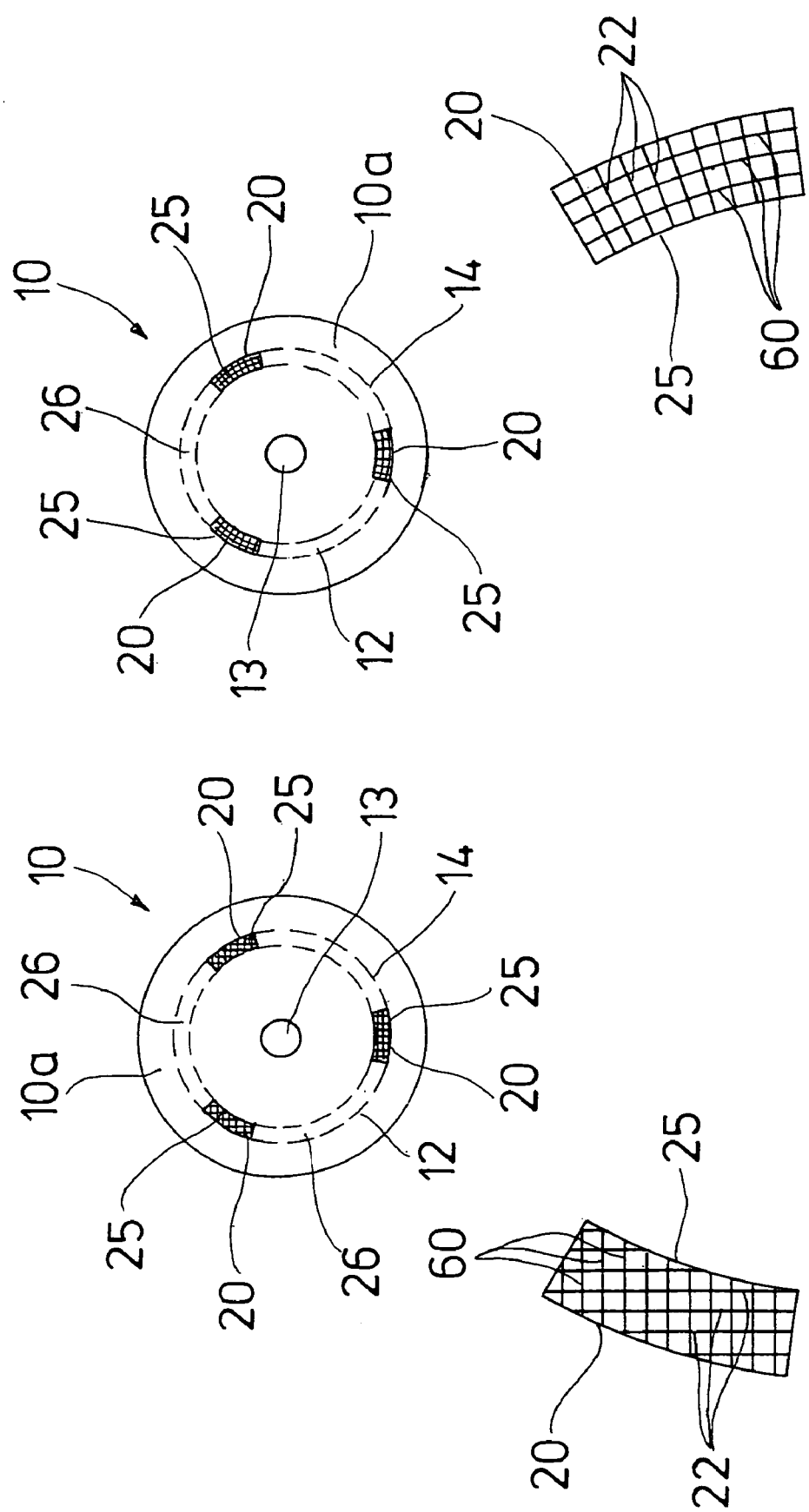

INFORMATION CARRIER

The invention relates to an information carrier.

Information carriers, in particular disc-shaped information carriers, which are composed of a substrate, for example glass, with a mounting opening, wherein on the substrate, a metal layer is disposed, are known. Circular tracks are disposed on the information carrier, wherein several tracks are concentric to each other. The tracks have marks which can be detected by means of the incident light and serve for determining the position of the information carrier relative to a reference point, for example an evaluating unit. The marks are normally designed such that light can pass through; the areas between the marks absorb or reflect the light or vice versa. Depending on whether a transmitted light method or a reflective light method has been used for determining the relative position is used, the passing or reflected light is detected.

For fabricating these marks, the surface of the information carrier is coated with a metal layer which has to be processed in different steps of photolithographic and chemical structuring. Additionally, a further step is necessary during fabrication, in which the mounting opening of the information carrier is fabricated. On the one hand, several fabrication steps are necessary, which lead to high fabrication costs. On the other hand, the aforedescribed fabrication steps are independent of each other, thus it is difficult to dispose the mounting opening in the desired relative position to the track, in particular to dispose it exactly concentric to the track with the marks.

The DE 10 2004 011 146 A1 describes a rotary encoder in which the marks are formed of the same material as the material of the substrate of the information carrier. Thus, it is possible to fabricate the information carrier in an injection molding process for achieving an exact arrangement of the marks relative to the mounting opening. The marks are formed by parts which are raised and lowered relative to the substrate surface. Therefrom result run-time differences of the light rays, which are incident from a perpendicular direction, said differences leading to a detectable interference of the individual light rays. The marks lead to a light signal which is different from that of the remaining area of the information carrier and can thus be detected. The disadvantage of this method consists in that for utilizing the interference effect, a coherent light source is necessary.

The objective of the invention consists in providing an information carrier which can be fabricated in an easy and cost-efficient manner, which enables a high precision in orienting the tracks relative to the mounting opening and which in particular allows the use of a common light source, such as for example a light emitting diode for generating the used light.

The objective of the invention is resolved by an information carrier with the features of the claim 1.

Advantageous designs and improved designs of the invention are described in the dependent claims.

The information carrier according to the invention is composed of a metal layer having at least one track, in which marks are disposed which can be detected by means of light incident upon the information carrier at an angle $\theta_i$ having the central wavelength $\lambda$ and being emitted by a light source, and from which the position of the information carrier relative to a reference point can be detected. The marks are formed by areas which are structured at least by first structures of a lattice period $\Lambda$, which are disposed on the back side and/or the front side of the metal layer. The lattice period ($\Lambda$) of the first structures satisfies the equation $\Lambda=\lambda/(n_p^*-\sin(\theta_i))$ or the equation $\Lambda=\lambda/(n_p^*+\sin(\theta_i))$, wherein $\lambda$ is the central wavelength of the used light, $\theta_i$ is the angle at which the light of the light source is incident upon the information carrier and $n_p^*$ is the effective index of a plasmon mode along the metal layer.

The fact that the marks are designed with structures of a particular lattice period $\Lambda$ make possible using the effect of the long-rage and short-range plasmon modes which spread along a thin metal layer which is structured on at least one side and which allow a transmission of light through the metal layer (see F. Pigeon et al.: "Identity of long-range surface plasmons along asymmetric structures and their potential for refractometric sensors", Journal of Applied Physics, Vol. 90, No. 1, pages 852-859 and N. Bonod et al.: "Resonant optical transmission through thin metallic films with and without holes", Optics Express, Vol. 11, Nr. 5, pages 482-490). This effect in particular enables using a common, cost-efficient light source such as a light emitting diode having the central wavelength $\lambda$ for detecting the marks of the information carrier.

If the information carrier is designed as a metal layer, the fabrication process in fact is more complicated than in the case of arranging the metal layer on a supporting substrate, but however no material for the substrate is necessary.

In a particularly advantageous embodiment of the invention, the metal layer however is disposed on a substrate. In this embodiment, the substrate of the information carrier in known fabrication processes can be fabricated in an easy and cost-efficient manner. Additionally, the metal layer can be applied on the substrate by means of common methods in a manner which as well is easy and cost-efficient. If first structures are disposed on the back side of the metal layer, first structures are arranged as well in particular on the front side of the substrate. These can in particular as well be generated by means of known fabricating processes, for example by means of an injection molding process. The exact orientation of the structures relative to the mounting opening of the information carrier in particular is made possible due to the fact that the fabrication of the substrate of the information carrier is effected in an injection molding step.

Preferably, the angle $\theta_i$ is 0°, which corresponds to a perpendicular incidence of the light. This in particular leads to the fact that the lattice period $\Lambda$ of the first structures satisfies the equation $\Lambda=\lambda/n_p^*$. The perpendicular light incidence provides for a particularly secure detection of the marks and enables a particularly simple geometric structure.

In a particularly preferred embodiment of the invention, the metal layer has a height (h) which is substantially homogeneous regarding the marks as well as outside the marks. This leads to the fact that in the marks, the first structures are disposed on the front side as well as on the back side of the metal layer, wherein these are parallel-staggered on the front side and on the back side, such that an undulated metal layer results. Such metal layer can be fabricated particularly easily when it is arranged on a substrate, since on the substrate, which then is also provided with respective structures, a homogeneous metal layer can be applied, which is possible by means of known methods such as for example vacuum evaporation methods in a manner which is particularly easy and cost-efficient.

In a particularly preferred embodiment of the invention, the first structures of the structured areas are sinusoidal. These structures can be fabricated particularly easily and allow for a particularly good generation of the plasmon modes along the metal layer which then has a sinusoidal, undulated shape.

In a particularly advantageous improved design of the invention, the metal layer is disposed on the substrate and a dielectric layer is disposed on the metal layer. One of the plasmon modes, the so-called plasmon mode having a high range has particularly low losses in the metal, when the longitudinal component of the electric filed within the metal layer, preferably approximately in the middle of the metal layer, has a change of sign. Such symmetrical course of the longitudinal component of the electric field results in particular when a dielectric having an identical or highly similar refraction index is disposed on each the front side and the back side of the metal layer. The course of the longitudinal component of the electric field within the metal layer can therefore be influenced be a dielectric layer which is disposed on the surface of the metal layer, in particular such that particularly good conditions for the generation of a plasmon wave result therefrom. Preferably, the dielectric layer is made of tantalum pentoxide, aluminum oxide, titanium oxide, hafnium oxide, polycarbonate or the material of the substrate. In case the dielectric layer consists of the material of the substrate, a symmetrical structure results. The thickness of the dielectric layer herein does not have to correspond to a defined thickness but advantageously is at least two or three times the penetration depth of the plasmon wave in the material. If the dielectric layer consists of another material than that of the substrate, the dielectric layer must have a defined thickness dependent on the material and the central wavelength $\lambda$ of the used light for influencing the trajectory of the longitudinal component of the electric field as set forth above.

In a preferred embodiment of the invention, the central wavelength $\lambda$ of the used light is about 890 nm. Herein, a standard light emitting diode which is particularly cheap is concerned.

Preferably, the first structures have a depth d which is below the lattice period $\Lambda$, preferably about $\frac{1}{3}*\Lambda$ to $\frac{1}{8}*\Lambda$, preferably—in particular when a light source having a central wavelength $\lambda$ of about 890 nm—about 60 nm to 130 nm is used. This as well promotes the generation of the plasmon modes and a transmission of the incident light which is as high as possible.

Advantageously, the metal layer consists of a metal which has low absorption in the wavelength range of the used light. In the non-structured areas external to the marks, in which the metal layer is a plane surface, it is thus assured that the incident light is sufficiently absorbed and/or reflected, such that the marks can be detected in a reliable manner. However, the low absorption leads to the fact that sufficient incident light is provided for a resonant transmission through the metal layer in the structured areas of the marks.

Preferably, the metal layer is made of gold, silver, copper or aluminum, since these metals have the desired optical properties at a high degree and additionally, can be easily applied on the surface of the substrate of the information carrier.

In a particular advantageous design of the invention, the metal layer has a height h which approximately corresponds to the penetration depth of the plasmon wave and which preferably is about 20 to 60 nm. Only thus is assured that the plasmon wave can extend along the metal layer without problems for enabling transmission of the incident light in the structured areas and a low transmission in the non-structured areas.

Preferably the back side of the information carrier has a polarizing lattice, the structures of which correspond to the first structures regarding their dimensions and the structures of which are arranged parallel to the first structures. Therein, in particular the light of the light wave is incident upon the information carrier in a perpendicular direction. A plasmon wave can be incited only by the polarized component of the incident light, the magnetic field vector of which is parallel to the first structures. This results in the fact that when non-polarized light is used, the contrast between the structured and the non-structured areas is lower compared to the use of polarized light. The generation of a polarizing lattice correspondingly polarizes the incident light and assures that the contrast between the structured and the non-structured areas is as high as possible. For using this embodiment, the light should preferably be incident from the back side of the information carrier for the incident light at first is polarized before being incident upon the first structures of the structured areas.

Preferably, second structures are disposed perpendicular to the first structures which correspond to the first structures regarding their dimension. These lead to the fact that in particular when the light is incident upon the information carrier from a perpendicular direction that an additional polarizing lattice, either on the back side of the information carrier or separately from the information carrier is not necessary, since each polarized component of an non-polarized light ray couples to a plasmon mode and thus enables the desired transmission of the light through the metal layer.

Advantageously, the metal layer is disposed on the substrate, and an undercoating is disposed between the substrate and the metal layer for improving the adhesion between the metal layer and the substrate, in particular when gold is used for the metal layer. This undercoating (undercoating) is preferably designed sufficiently thin for not having any optical effect. Additionally, it is preferred that it has a thickness of only few nanometers. In particular suitable for such undercoating is titanium oxide or another material which only has low optical losses.

Advantageously, the non-structured areas, i.e. the areas outside the marks absorb the incident light. Thus, the information carrier is in particular appropriate for the transmitted light method, since the marks are substantially translucent and the non-structured areas are substantially optically opaque. Therein, the absorption preferably should not be too high, since in this case, also the transmission through the structured areas would be degraded. The light source thus can be disposed on one side of the information carrier, whereas from the back side, a light detector, for example one or more photodiodes are disposed which, depending on the incidence point of the light on the information carrier, detect or determine that due to the absorption in the non-structured areas, the light is incident upon one of the areas between the marks.

In an advantageous design of the invention, the first structures are arranged parallel to each other in all marks of the information carrier. Thus, a particularly easy fabrication method can be achieved.

Preferably, the information carrier is disc-shaped and the track is circular. Thus, the information carrier can be used as code disc in rotary encoders.

In such code disc preferably the first structures in all marks of the information carrier are arranged substantially radial or substantially concentric, wherein the first structures within one mark are substantially parallel to each other.

Advantageously, the substrate of the information carrier is fabricated in an injection molding process, since this type of fabrication process is cost-efficient as well as technically mature.

Advantageously, an information carrier according to one of the foregoing claims is used in a linear or rotary encoder for determining the relative position of the information carrier with respect to a reference point, in particular for measuring of the translatory or rotary movement.

Figure 1C:
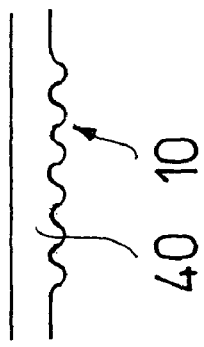
Figure 1F:
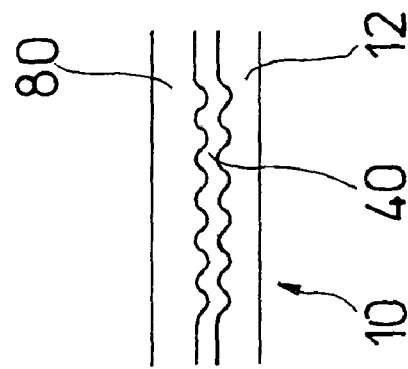
Figure 1B:
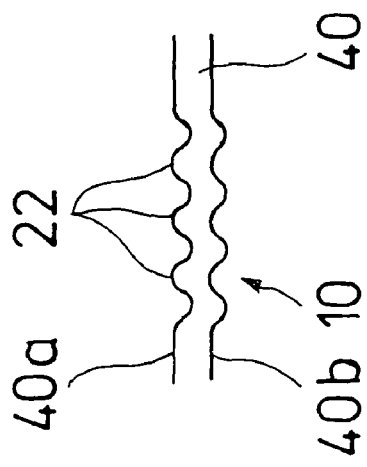
Figure 1E:
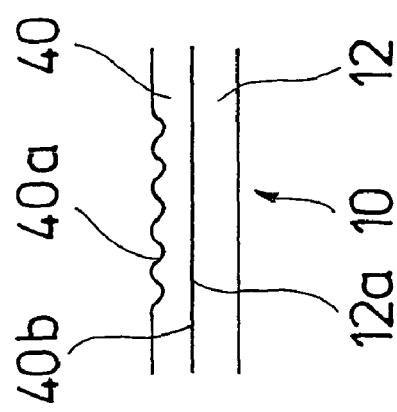
Figure 1D:
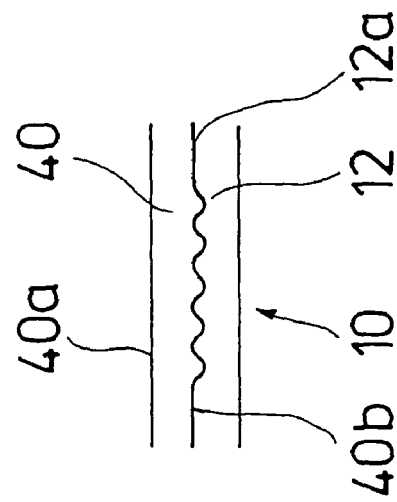
Figure 2:
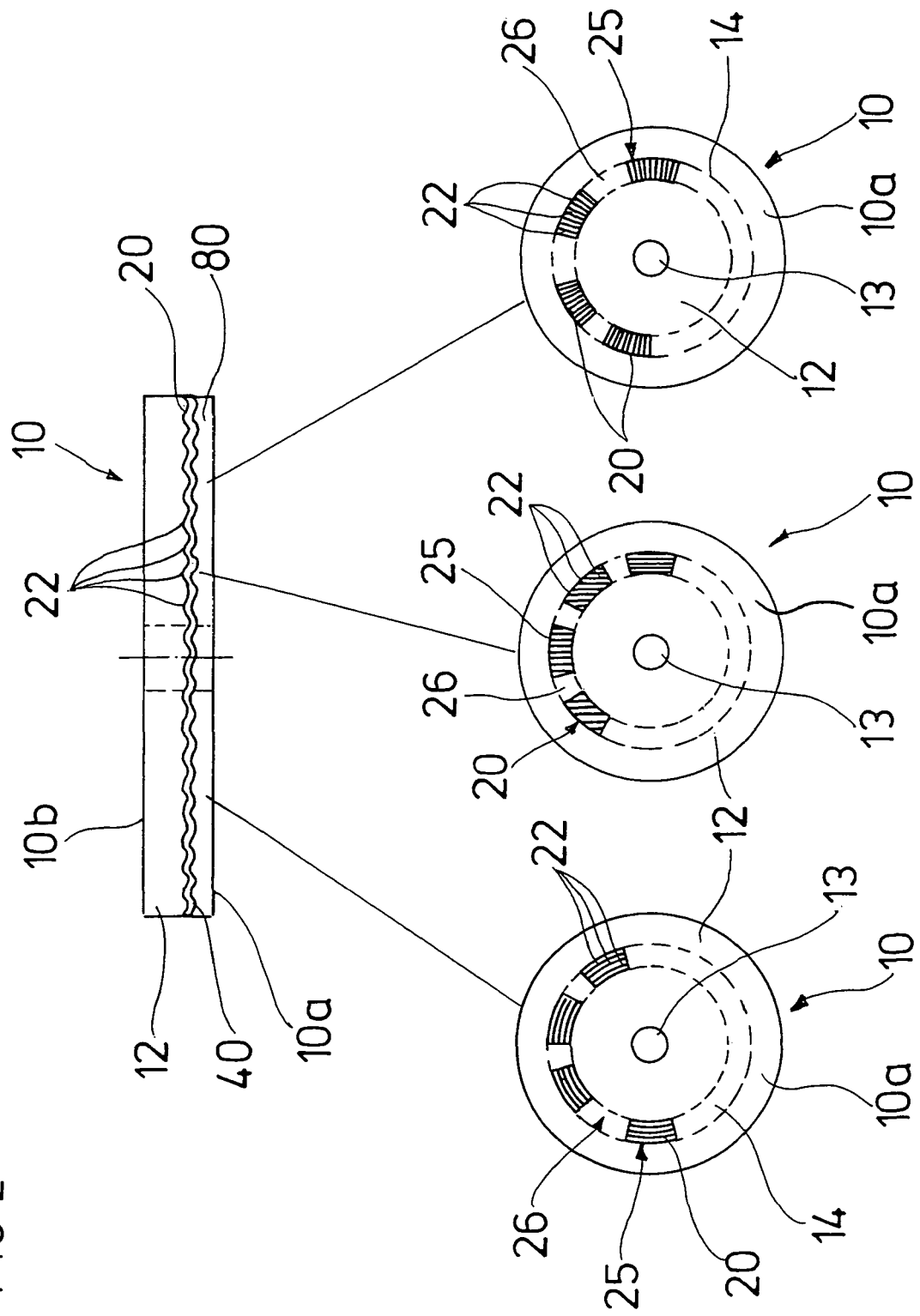
Figure 3:
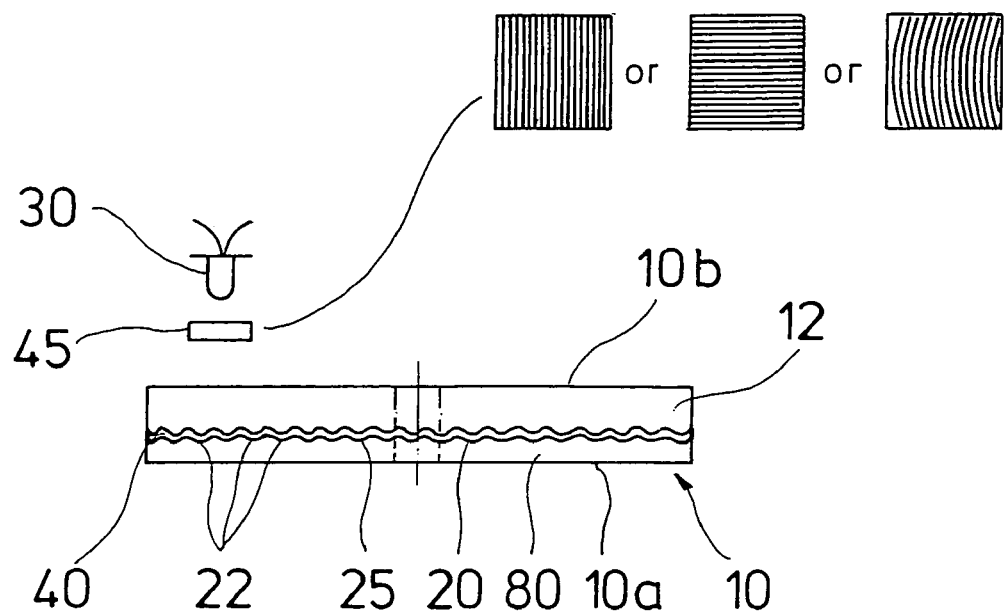
Figure 5:
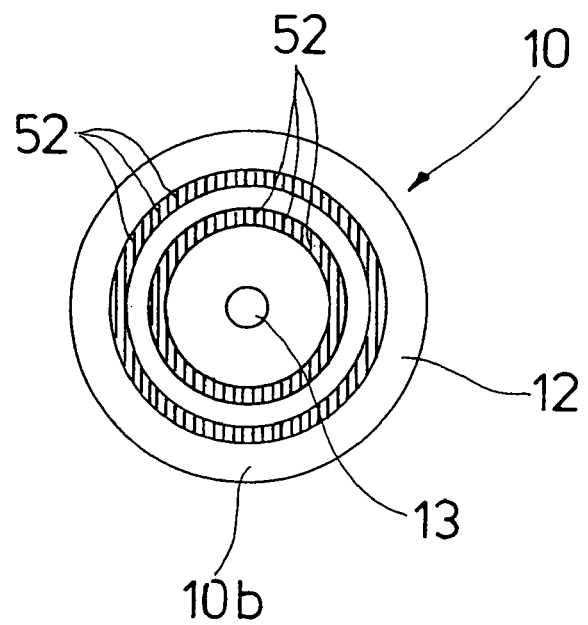
Figure 4:
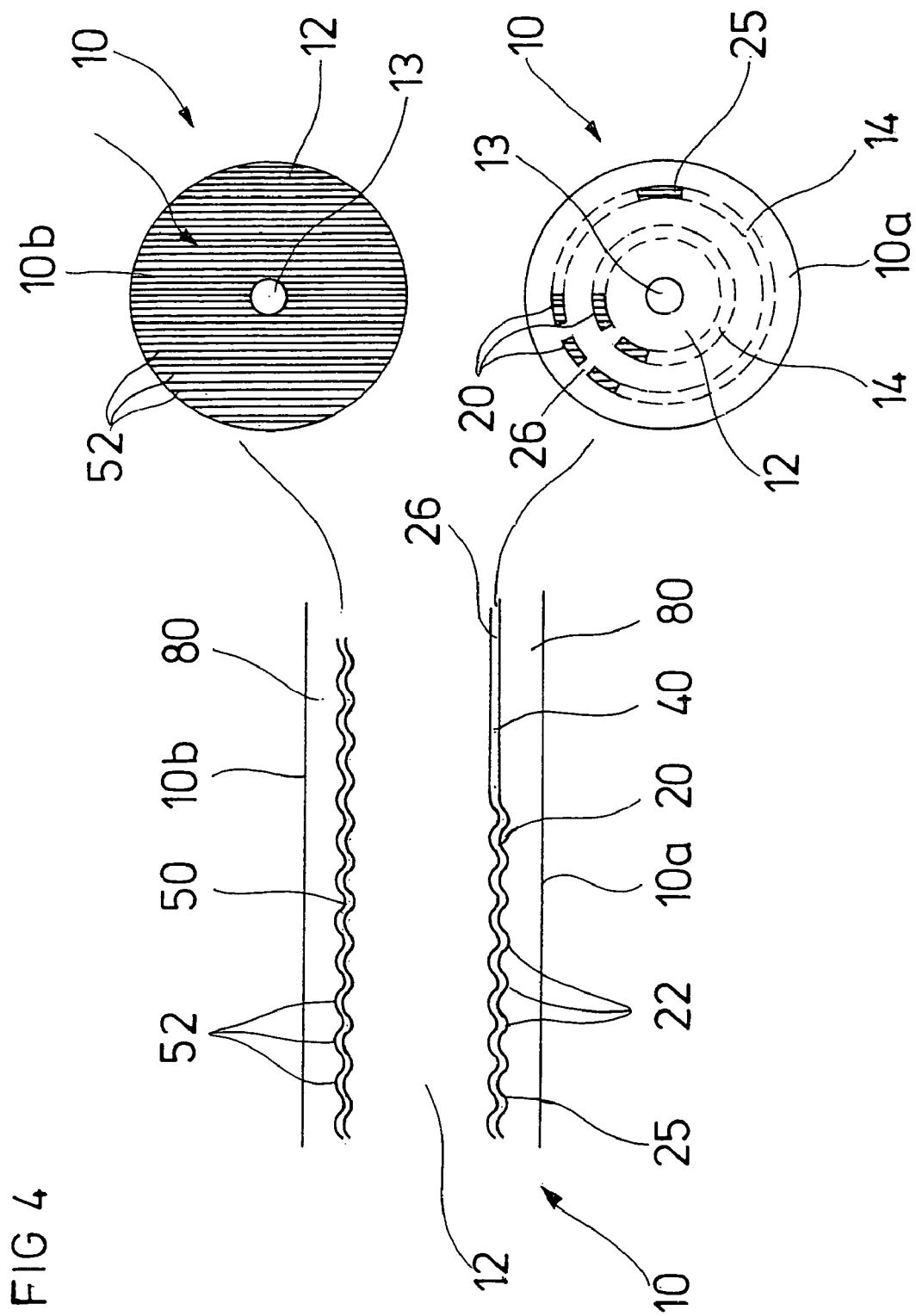
Figure 7A:
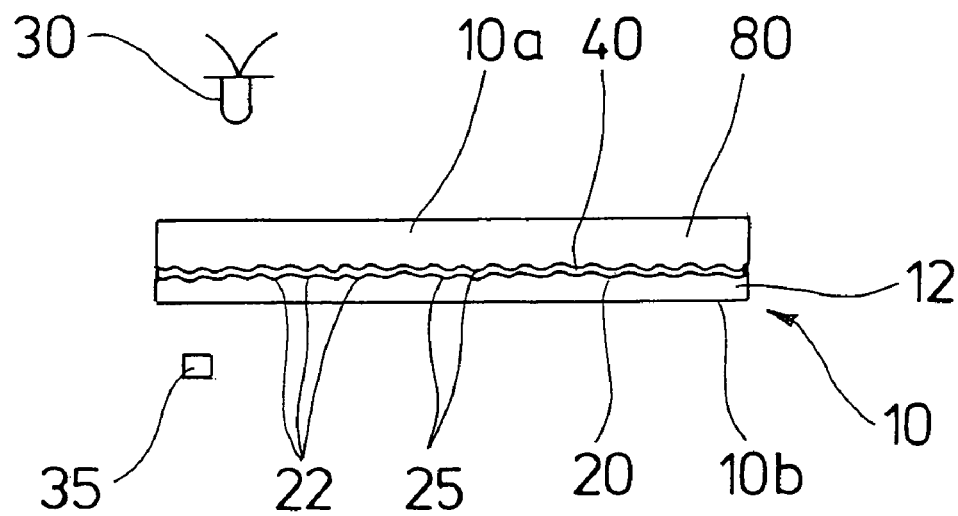
Figure 7B:
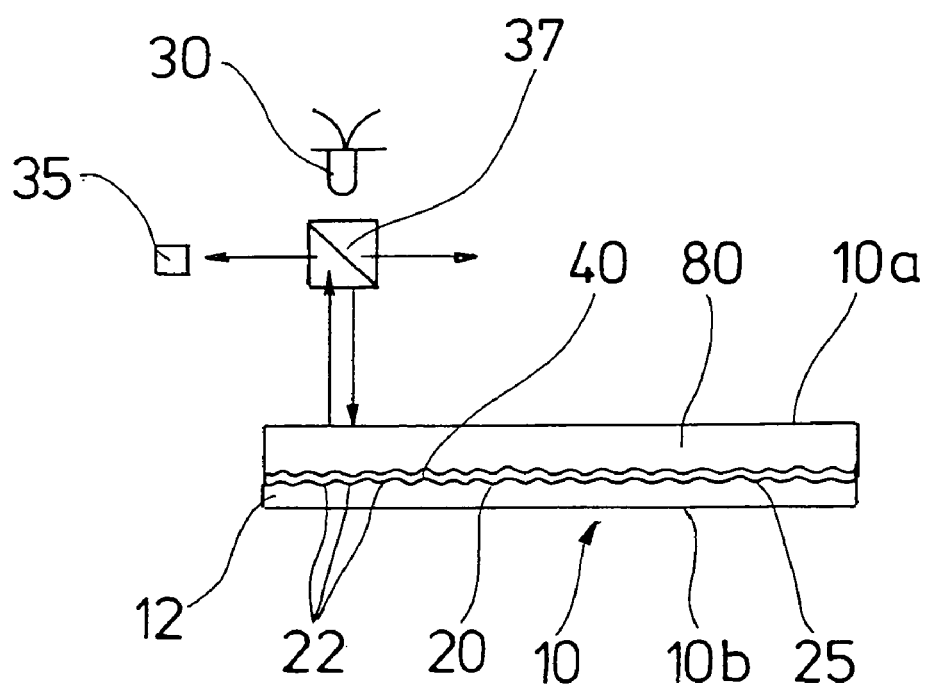
Figure 8:
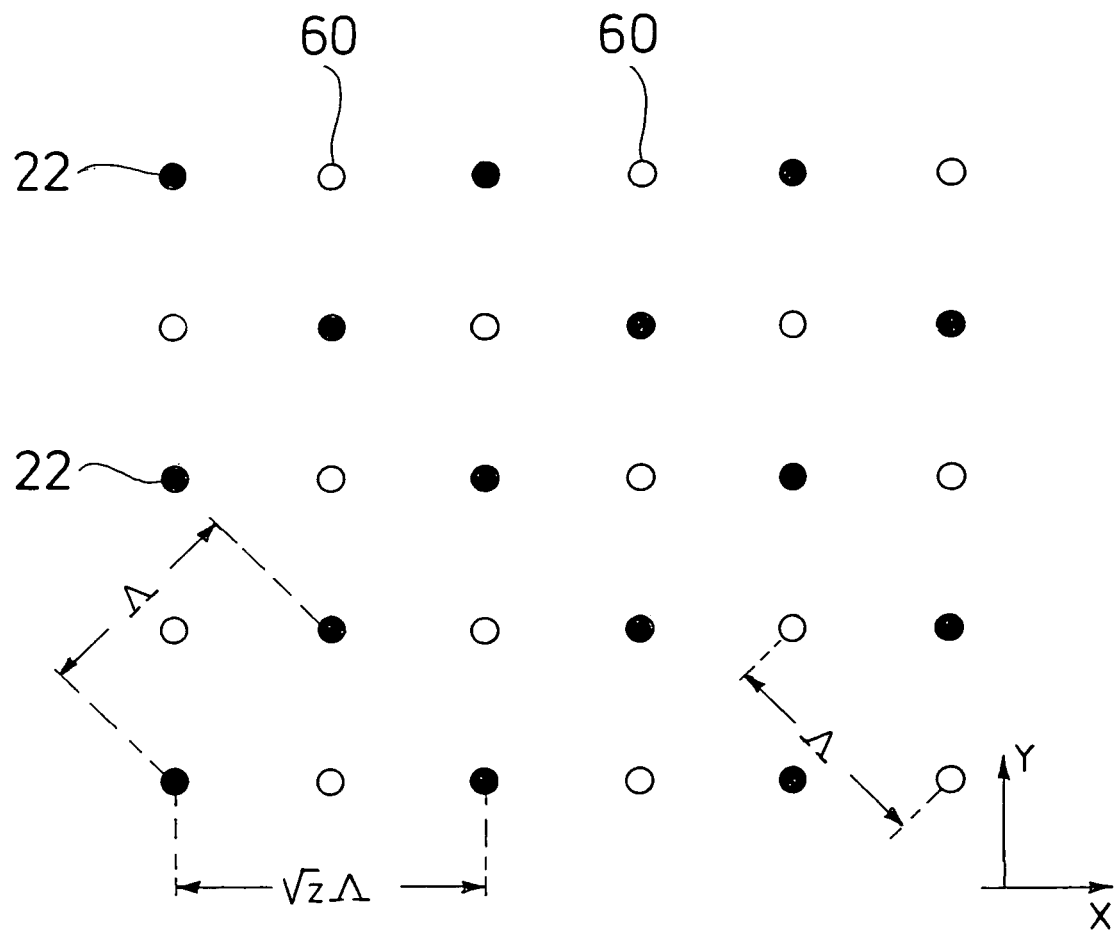
Figure 9A:
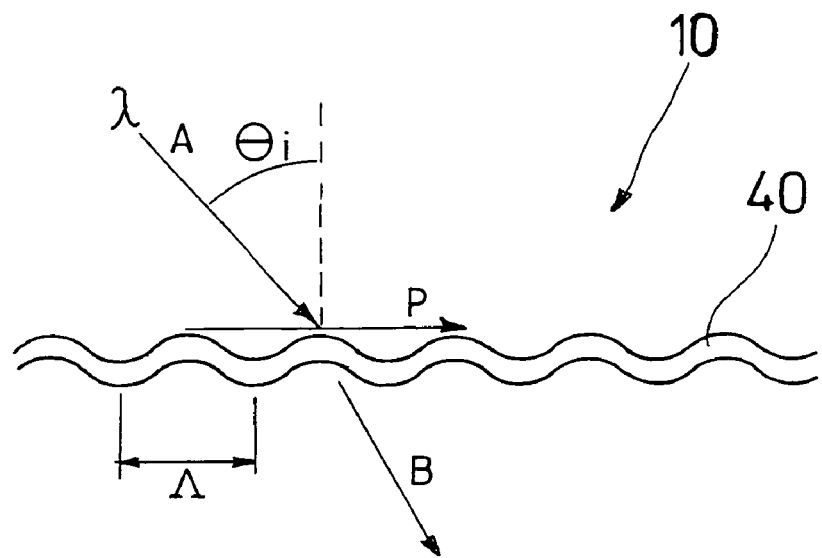
Figure 9B:
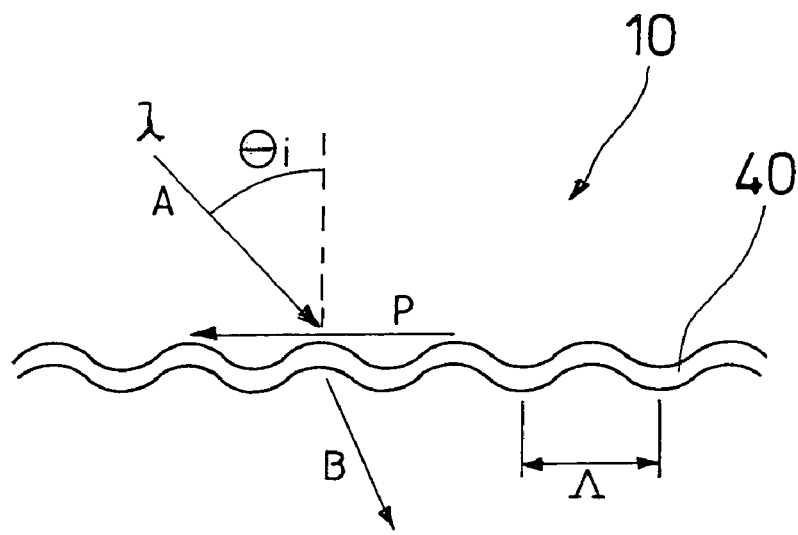

The invention is described in detail by means of the following figures. In the drawings:

FIG. 1a shows a cross-section of a mark of an information carrier having a substrate and a metal layer disposed thereon, FIG. 1b shows a cross-section of a mark of a further embodiment of an information carrier, FIG. 1c shows a cross-section of a mark of a further embodiment of an information carrier, FIG. 1d shows a cross-section of a mark of a further embodiment of an information carrier, FIG. 1e shows a cross-section of a mark of a further embodiment of an information carrier, FIG. 1e shows a cross-section of a mark of a further embodiment of an information carrier, FIG. 1f shows a cross-section of a mark of a further embodiment of an information carrier, FIG. 2 shows a cross-section of an information carrier with a substrate with marks as well as a top view of three alternative embodiments of the front side of the information carrier, FIG. 3 shows a cross-section of an information carrier with a schematically represented light source and external polarization filter, FIG. 4 shows a cross-section of an information carrier with a top view of the back side and the front side of the information carrier, FIG. 5 shows an alternative embodiment of the back side of the information carrier according to FIG. 4, FIG. 6a shows a top view of the front side of the information carrier according to a further embodiment, FIG. 6b shows an alternative embodiment of the front side of the information carrier according to FIG. 6a, FIG. 7a shows a cross-section of an information carrier having a light source and a light detector in the transmitted light method, FIG. 7b shows a cross-section of an information carrier with light source and light detector in the reflective light method, FIG. 8 shows a diagrammatic top view of a structured area with first and second structures being perpendicular to each other, FIG. 9a shows a diagrammatic illustration of the ratios upon incident light at an angle $\theta_i$ and forward coupling and FIG. 9b shows a diagrammatic illustration of the ratios upon incident light at an angle $\theta_i$ and backward coupling.

The same reference numbers in different figures refer to identical or substantially identical parts.

In FIG. 1a, a cross-section is represented by a partial area of an information carrier 10 having a front side 10a and a back side 10b and having a substrate 12 with a refraction index $n_s$ on the front side 12a of which a metal layer 40 with the height h is disposed. The substrate 12 for example is made of glass or plastic, preferably of PMMA, which can also be processed in the injection molding process. The information carrier 10 has a mark 20 which is formed by a structured area 25 which is provided with first structures 22. Therein, the structures 22 in the present embodiment are formed on the front side 40a as well as on the back side 40b of the metal layer 40 and thus on the front side 12a of the substrate 12. The first structures 22 in the structured area 25 are arranged with a lattice period $\Lambda$ and disposed parallel to each other an preferably sinusoidal. Therein, the first structures 22 have a depth d. Since the metal layer 40 has a homogeneous height h on the entire surface 10a of the information carrier 10, the metal layer 40 in the structured area 25 is wave-shaped, in particular sinusoidal, wherein the depth d of the first structured 22 of the metal layer 40 corresponds to the depth d of the first structures 22, and the lattice period $\Lambda$ of the metal layer corresponds to the lattice period $\Lambda$ of the first structures 22 of the substrate 12. Adjacent to the mark 20, areas 26 can be found which are not structured; here, the surface of the information carrier 10 is a plane surface.

The metal layer 40 is designed such that incident light of the central wavelength $\lambda$ couples to a plasmon wave which again is converted into transmitted light. In the FIGS. 9a and 9b, the ratios upon light having the wavelenght $\lambda$ incident upon the metal layer 40 are diagrammatically shown at an angle $\theta_1$ relative to the normal line on the front side 10a of the information carrier 10. When the light at the angle $\theta_i$ is not directly incident upon the metal layer 40 but on the substrate 12 or on a dielectric layer 80 which is to be described in FIG. 1f below, the light is refracted when passing the substrate 12 or the dielectric layer 80 respectively. Dependent on the lattice period $\Lambda$, the incident light only couples in one direction along the metal layer 40. The so-called forward coupling is shown in FIG. 9a, whereas the so-called backward coupling is shown in FIG. 9b. The incident light therein is represented by the arrow referred to as A; the transmitted light by the arrow referred to as B and the direction of the coupled plasmon wave is represented by the arrow referred to as P. In the case of forward coupling, the lattice period $\Lambda$ satisfies the equation $\Lambda=\lambda/(n_p{}^*-\sin(\Theta_i))$, in the case of backward coupling to the equation $\Lambda=\lambda/(n_p{}^*+\sin(\Theta_i))$, wherein $n_p{}^*$ is the effective index of a plasmon mode along the metal layer 40.

In FIG. 1a, the special case in which light is incident upon the front side 10a of the information carrier 10 from a perpendicular direction. In this case, the lattice period $\Lambda$ of the first structures 22 also satisfies the equation $\Lambda=\lambda/n_p{}^*$, wherein $\lambda$ is the central wavelength of the used light and $n_p{}^*$ is the effective index of the plasmon mode along the metal layer 40. The incident light herein couples in both directions along the metal layer 40.

The metal layer 40 preferably consists of gold, silver, copper or aluminum, since these metals are especially useful for generating plasmon waves. Between the metal layer 40 and the substrate 12, a not represented undercoating can be disposed which provides for a better adhesion of the metal layer 40 on the substrate 12, which however is not absolutely necessary. The undercoating should be designed thin enough for not having any optical effect. Therefor, the undercoating for example has a thickness of only few nm, for example less than 10 nm. The undercoating for example consists of titanium oxide which in particular provides for a good adhesion of metal layers 40 which are made of gold or of another material which only has low optical losses.

The height h of the metal layer 40 furthermore is preferably designed such that it approximately corresponds to the penetration depth of the plasmon wave into the metal layer 40, so that the field of the plasmon mode is strong on both boundary layers for enabling the transmission of the light through the metal layer 40. Therefor, the height h of the metal layer 40 is preferably between 20 nm and 60 nm. For optimally forming the plasmon wave in the metal layer 40, preferably also the depth d of the first structures 22 should be adapted to the central wavelength $\lambda$ of the incident light and should in particular be considerably smaller than the lattice period $\Lambda$, for example only ⅕*$\Lambda$ to ⅛*$\Lambda$, preferably between 60 nm and 130 m. In particular, when the lattice period $\Lambda$ is between 60 nm and 130 nm, a plasmon wave can be generated by means of the light of a standard light emitting diode, in particular of a light emitting diode with a central wavelength of the emitted light of $\lambda$=890 mm. Depending on the used light source, which for example can also have wavelengths in the range of 500 nm to 1550 nm, the dimensions of the first structures 22 are scaled, wherein the height of the metal layer 40 however substantially is in the same order of magnitude.

In the FIGS. 1b to 1f, further embodiments of an information carrier 10 are represented. The FIGS. 1b and 1c show the information carrier 10 which is substantially formed by the metal layer 40 and has no substrate 12. The fabrication of such information carriers 10 is complicated; however it has the advantage that no material for the substrate is necessary. Furthermore, the dielectric is identical on the front side 40a and on the back side 40b of the metal layer 40, i.e. air; thus, the plasmon modes can be optimally generated. In the embodiment according to FIG. 1b, on the front side 40a as well as on the back side 40b of the metal layer 40, first structures 22 are arranged, whereas in the embodiment according to FIG. 1c, a side 40a, 40b of the metal layer is plane and the first structures 22 are only formed in the other side 40b, 40a. The FIGS. 1d to 1f illustrate the information carrier with the substrate 12 and the metal layer 40. In the embodiment according to FIG. 1d, the first structures 22 are formed in the back side 40b of the metal layer 40 and thus also in the front side 12a of the substrate 12, whereas the front side 40a of the metal layer 40 is designed as a plane surface. In the embodiment according to FIG. 1e, the first structures 22 are only formed in the front side 40a of the metal layer 40, whereas the back side 40b of the metal layer 40 and thus, also the front side 12a of the substrate 12 is designed as a plane surface. The embodiment according to FIG. 1f shows the information carrier with the substrate 12 and the metal layer 40, in which in the first structures 22 are formed in the front side 40a as well as in the back side 40b, wherein a dielectric layer 80 is additionally disposed on the front side of the metal layer 40. The dielectric layer 80 has the function of providing particularly good conditions for generating a plasmon wave. The plasmon wave is particularly strong when the longitudinal component of the electric field has a change of sign within the metal layer 40, preferably approximately in the middle of the metal layer 40. The trajectory of the longitudinal component of the electric field is influenced by the substrate 12 and possibly the dielectric layer 80 which is disposed on the surface of the metal layer 40, in particular by selecting an appropriate material with an appropriate refraction index and an appropriate thickness of the dielectric layer 80. For achieving a symmetrical trajectory of the longitudinal component of the electric field, preferably dielectrics with identical or similar refraction indices are used. Therefore, the embodiment shown in FIG. 1b is particularly useful for forming a strong plasmon wave, since in this case, air is present on both sides of the metal layer 40, so that a perfectly symmetrical structure results. In contrary, when the metal layer 40 is disposed on the substrate 12, the dielectric layer 80 preferably is made of tantalum pentoxide, aluminum oxide, titanium oxide, hafnium oxide or polycarbonate or the material of the substrate 12, for example PMMA for appropriately influencing the trajectory of the longitudinal component of the electric field. If the dielectric layer is made of the material of the substrate, a symmetrical structure is achieved. The thickness of the dielectric layer 80 therein does not have to correspond to a defined thickness but preferably is at least two times to three times the penetration depth of the plasmon wave into the material. If the dielectric layer 80 is made of a material which is different from the material of the substrate 12, the dielectric layer 80 must have a defined thickness dependent on the material which is used for the dielectric layer 80 and the central wavelength λ of the used light for correspondingly influencing the trajectory of the longitudinal component of the electric field.

In the information carriers 10 which are substantially symmetrical, i.e., in the case of the information carrier 10 only being composed of the metal layer 40 or in the case of the information carrier 10 being composed of the metal layer 40 disposed on the substrate 12 which is covered by the dielectric layer 80, wherein the dielectric layer 80 is made of the same material as the substrate 12, the effective index $n_p^*$ satisfies the approximate equation $n_p^* = n_s(\epsilon_m/(n_s^2 + \epsilon_m))^{1/2}$, wherein $n_s$ in the first case is the refraction index of air and in the second case is the refraction index of the substrate 12 and $\epsilon_m$ is the dielectric constant of the metal layer 40. This represents an approximation for the long-range plasmon mode as well the short-range plasmon mode. Generally, the effective index $n_p^*$ is slightly smaller than the effective index $n_p^*$ which had been determined by the indicated approximate equation, whereas the effective index $n_p^*$ is slightly above the effective index $n_p^*$ which has been determined according to the approximate formula. Thus, the effective index $n_p^*$ and therefrom, the lattice period Λ of the first structures 22 can be determined, provided the materials for the substrate 12 and the metal layer 40 being defined and the light emitting diode being defined with fixed central wavelength λ.

As shown in FIG. 2, the entire information carrier 10 has several marks 20 on its front side 10a which are respectively formed by an area 25 structured by means of the first structures 22 according to FIG. 1a. Furthermore, the information carrier 10 has a central mounting opening 13 for mounting the information carrier 10. For detecting the marks 20 by means of incident light of the wavelength λ, the following effect is utilized: In the non-structured areas 26, the incident light is substantially absorbed into the metal layer 40 or reflected therefrom. Preferably, the metal layer 40 is made of a metal which has low absorption in the wavelength area of the used light, for assuring that in the non-structured areas 26, the incident light is at least partially absorbed or reflected, whereas in the structured areas 25 however sufficient light for the resonant transmission is provided.

In the transmitted light method, which is schematically represented in FIG. 7a, only little light, in the optimal case, no light at all, can be detected by the light detector 35, which is disposed on the opposite side of the light source 30 on the other side of the information carrier 10, when the light emitted by a light source 30 is incident upon a non-structured area 26. When the light is incident upon a structured area 25, a plasmon mode is incited in the metal layer 40, which leads to a transmission of the incident light through the metal layer 40 and the mark 20. The light detector 35 detects a signal and can thus recognize the mark 20.

When several alternating marks 20 are disposed in structured areas 25 and non-structured areas 26 in a track 14, as represented in FIG. 2, the number of passing marks 20 can be counted when the information carrier 10 is moved relative to the light source 30 along the track 14 and therefrom, an information concerning the relative position of the information carrier 10 relative to a reference point, for example the light source 30, the light detector 35 or an evaluation unit, can be determined.

As an alternative to the transmitted light method, the relative position of the information carrier 10 to a reference point, for example the light source 30 or an evaluation unit, can be determined in the reflective light method, as schematically represented in FIG. 7b. In this method, the light which is reflected by the non-structured areas 26 is deviated by means of a beam splitter 37 to a light detector 35 in which it is detected and which is arranged on the same side of the information carrier 10 as the light source 30. When light is incident upon a mark 20, the incident light is transmitted due to the aforedescribed effect, so that no signal can be detected in the light detector 35.

When the information carrier 10 is designed disc-shaped as represented in FIG. 2, it can be particularly formed as a code disc in a rotary shaft, either in the transmitted light method or in the reflective light method. Alternatively the information carrier 10 can be substantially rectangular with a linear track for being used as a translation encoder.

In FIG. 2, three alternative embodiments of the front side 10a of the information carrier 10 are represented. The dielectric layer 80 is not shown in these top views of the front side 10a of the information carrier 10 in FIG. 2. It is important for generating the plasmon waves in the metal layer 40 of the marks 20 which is undulated due to the first structures 22 that the first structures are parallel to each other and are arranged with a lattice period Λ to each other. The first structures 22 however can be arranged either concentric to each other or substantially radial or parallel in all marks 20 of the information carrier 10 in the case of a disc-shaped structure of the information carrier 10, as can be seen in FIG. 2. The latter variant is perfectly suitable since an injection mold for the fabrication of the substrate 12 in the injection molding process can be fabricated particularly easily; this variant however is not suitable for being used in combination with an external polarizing lattice, as described in the following with respect to the FIG. 3, since the orientation of the first structures 22 relative to the determined light source 30 is different for each mark. Depending on the purpose of the application, the different embodiments have different advantages.

The plasmon wave substantially only is formed by means of polarized light. For achieving a good contrast between the structured areas 25 in the marks 20 and the remaining parts of the substrate 12, it is advantageous to polarize the incident light. This can for example be effected as represented in FIG. 3 by means of an external polarizing lattice 45, in which the polarization planes have to be arranged parallel to the first structures 22 for achieving the desired effect. When the first structures 22 are arranged substantially radial, the polarization planes have to be arranged as represented in the figure in the middle. When the first structures 22 are arranged substantially perpendicular to the radial orientation, an arrangement of the polarization planes as in the left figure results, and when the first structures 22 are arranged substantially concentric to each other, an arrangement of the polarization planes as represented in the right figure in FIG. 3 results.

In an alternative embodiment which is represented in FIG. 4, a polarizing lattice 50 can be formed in the substrate 12 by forming structures 52 which correspond to the first structures 22 regarding their dimensions and which are arranged in parallel thereto. Therein, the polarization lattice 50 is arranged on the back side 10b of the information carrier 10, as represented in FIG. 4. Both the polarization lattice 50 and the metal layer 40 are preferably covered by a dielectric layer 80. In FIG. 4, furthermore a top view of the back side 10b and a top view of the front side 10a of the information carrier 10 is represented, which does not show the dielectric layers 80. Therefrom can be seen that on the front side, two tracks 14 are arranged concentric to each other, wherein in each track several marks 20, which are formed by structured areas 25, are arranged alternately to non-structured areas 26. By arranging several tracks 14 on an information carrier 10, the information density can be considerably increased. The polarizing lattice 50, which is disposed on the back side 10b of the information carrier 10 is oriented parallel to the first structures 22 of the marks 20 on the front side 10b of the information carrier 10 with its structures 52. In this embodiment, the light should be incident upon the information carrier 10 from the back side 10b of the information carrier 10, so that the light at first is polarized and only is incident upon the metal layer 40 in the polarized state.

In FIG. 5, an alternative embodiment of the lattice 50 according to FIG. 4 which is formed in the back side 10b of the information carrier 10, is shown. Arranging the polarizing lattice 50 only in the sections of the information carrier 10 where the light is incident and in particular where it is incident upon the track 14, is sufficient.

In a further alternative embodiment of the invention, a good yield of the incident light can also be achieved without polarization of the light by forming second structures 60 in the structured areas 25 which are perpendicular to the first structures 22 which in their dimensions approximately correspond to the dimensions of the first structures 22 (see FIGS. 6a and 6b). Thus, a structure which is undulated in two dimensions is formed in the structured areas 25. Therein, the height Z of the undulated structure in the structured areas 25 in function of the coordinates x and y preferably satisfies the equation $$Z(x,y)=H(1+\cos((2)^{-1/2}2\pi/\Lambda x)\cos((2)^{-1/2}2\pi/\Lambda y)) \qquad (I),$$

wherein H is half of the height of the undulated structure, and Λ is the lattice period. Alternatively, the height Z of the structure which is undulated in two dimensions satisfies the equation $$Z(x,y)=H(1+0,5\cos(2\pi/\Lambda x)+0,5\cos(2\pi/\Lambda y)) \qquad (II).$$

An example for the structure which is undulated in two dimensions, the height Z of which corresponds to the first equation (I), is shown in a top view in FIG. 8. The expression $\cos((2)^{-1/2}2\pi/\Lambda x)$ according to equation I defines a surface relief which has the period $(2)^{-1/2}\Lambda$ in x-direction, wherein linear lattice lines are arranged parallel to the y-axis. Since the lattice period for coupling the incident light to a plasmon mode is Λ, this lattice does not allow for a coupling of the light to a plasmon mode. The expression $\cos((2)^{-1/2}2\pi/\Lambda y)$ according to equation I defines a surface relief which is periodic to the period $(2)^{-1/2}\Lambda$ in y-direction, wherein the lattice lines are parallel to the x-axis. This lattice does not allow for a coupling of the incident light to a plasmon mode, too, since therefor, the period of the lattice would have to be Λ. The product of both aforedescribed expressions results in a surface relief having raised and lowered parts as illustrated in the FIG. 8, wherein the raised parts which project from the paper surface are illustrated by filled circles, the lowered parts which protrude into the paper surface are illustrated by open circles. The depth of the resulting surface relief is 2 H.

The described resulting surface relief corresponds to first structures 22 with the period Λ which are disposed at an angle of 45° relative to the x- and y-axis and second structures 60 of the period Λ which are disposed at an angle of 90° relative to first structures 22. Here, the first and second structures 22, 60 in comparison to the first structures 22, which are not crossed with second structures 60, do not have a homogeneous depth but a modulated sinusoidal depth. The depth 2 H of the resulting surface relief in a structure which is undulated in two dimensions therefore has to be above the depth d in a structure which is only undulated in one dimension for achieving the same effect of high transmission.

Since the period of the first structures 22 and the second structures 60 is Λ, both structures 22, 60 allow for a coupling of the incident light to a plasmon mode, that is the first structures 22 to a plasmon mode which is inclined to 45° relative to the positive x axis and the second structures to a plasmon mode which is inclined to 135° relative to the positive x axis. Therefrom results the fact that the incident light with any polarization has a high transmission due to the structure which is undulated in two dimensions.

When the light is incident from a perpendicular direction, the lattice period Λ of the first structures 22 and the second structures 60 satisfies the equation $\Lambda=\lambda/n_p^*$, wherein λ is the central wavelength of the used light and $n_p^*$ is the effective index of a plasmon mode along the metal layer 40. Herein, it is to be noted that the effective index $n_p^*$ in a one-dimensional structured area 25 is slightly different from the effective index $n_p^*$ in a two-dimensionally structured area 25.

When the surface relief corresponds to the structure of the equation II which is undulated in two dimensions and is therefore described by a sum of two periodic functions, the incident light couples to a plasmon mode in x-direction due to a periodic surface relief which is described by the expression $\cos(2\pi/\Lambda x)$, and to a plasmon mode in y-direction by means of a periodic surface relief which is described by the expression $\cos(2\pi/\Lambda y)$.

As represented in FIG. 6a and the respective enlarged section, the first structures 22 can be designed parallel to each other in all marks 20 or, as represented in FIG. 6b and the respective enlarged section, the first structures 22 can be radial and the second structures 60 can be substantially concentric to each other or the first structures 22 can be substantially concentric to each other and the second structures 60 can be arranged radial.

The information carrier 10 of the embodiment according to the FIG. 1a or 1d to 1f can be fabricated in few fabrication steps. At first, the substrate 12 is fabricated in an injection molding process. For this purpose, in the respective injection mold in the embodiments according to the FIGS. 1a, 1d and 1f the marks 20 with the first structures 22 as well as the mounting opening 13 and if necessary the second structures 60 or the structures 50 of a polarizing lattice 52 can be simultaneously formed, such that the orientation of the marks 20 in the track 14 relative to the mounting opening 13 can be effected with high precision and difficult adjustment steps are not necessary. Subsequently, the metal layer 40 is applied on the front side 10a of the information carrier 10, for example by means of an evaporation or a sputter process, wherein for the embodiments according to the FIG. 1a or 1f, an homogeneous thickness h of the metal layer 40 in particular also in the area of the marks 20 as well as the uniformly undulated structure of the metal layer 40 above the first structures 22 is achieved. If necessary, the metal layer 40 can be covered with a dielectric layer 80 by means of an evaporation or sputter process as according to the embodiment illustrated in the FIG. 1f.

A first exemplary embodiment of the information carrier 10 is made of the following materials and has the following dimensions. The substrate 12 is made of PMMA having a refraction index $n_s$ of 1,48 and only is structured in one dimension with the first structures 22. The first structures 22 have a depth d of 87 nm and a lattice period $\Lambda$ of 581 nm. On the front side 10a of the information carrier 10, a metal layer 40 made of silver with a height h of 30 nm is applied, wherein the silver material has a dielectric constant $\in_m$ of $-36+i2$. The metal layer 40 is covered by a dielectric layer 80 made of PMMA, wherein the thickness of the PMMA layer should be more than the penetration depth of the plasmon wave into the metal layer 40 and for example is more than 2 μm. As light source 30, a light emitting diode having a central wavelength $\lambda$ of 890 nm is used. In this configuration, due to the structured areas 25, a transmission of the respective polarized component of the incident light of more than 90% results.

A second exemplary embodiment of the information carrier 10 with respectively perpendicular first structures 22 and second structures 60 is made of the following materials and has the following dimensions. The substrate 12 and the dielectric 80 are made of PMMA with a refraction index $n_s$ of 1,48. The first structures 22 and the second structures 60 have a depth d of 125 nm and a lattice period $\Lambda$ of 583 m. The small difference of the lattice period $\Lambda$ in the present second exemplary embodiment of a two-dimensional structured area 25 of 583 nm compared to 581 nm in the first exemplary embodiment results from the small differences in the effective index np* for one-dimensional or two-dimensional structures areas 25. From the lattice period $\Lambda$ of 583 m, a period of 2½$\Lambda$=825 nm along the x-axis and the y-axis in FIG. 8 results. In particular, the height difference 2 H of the surface relief, which is undulated in two dimensions, is about 125 nm. A metal layer 40 which is made of gold having a height h of 45 m is applied on the front side 10a of the information carrier 10, wherein the gold has a dielectric constant $\in_m$ of $-36+j2$. As light source 30, a light emitting diode having a central wavelenght of 890 m is used. In this configuration, a transmission of the respectively polarized component of the incident light of about 80% results due to the structured areas 25, whereas outside the structured areas 25, a transmission of only about 2,2% results in the flat areas of the substrate 12.

LIST OF REFERENCE NUMBERS

10 Information Carrier
10a Front Side
10b Back Side
12 Substrate
12a Front Side
12b Back Side
13 Mounting Opening
14 Track
20 Marks
22 First Structures
25 Structured Area
26 Non-Structured Areas
30 Light Source
35 Light Detector
37 Beam Splitter
40 Metal Layer
40a Front Side
40b Back Side
45 External Polarizing Lattice
50 Polarizing Lattice
52 Structures Of The Polarizing Lattice
60 Second Structures
80 Dielectric Layer
$\Lambda$ Wavelength
$\Lambda$ Lattice Period
$\Theta_i$ Angle
D Depth
H Height
$N_p^*$ Effective Index
$N_s$ Refraction Index Of The Substrate
$N_c$ Refraction Index Of The Dielectric Layer
$E_m$ Dielectric Constant Of The Metal Layer
A Incident Light
B Transmitted Light
P Plasmon Wave

The invention claimed is:

1. An information carrier comprising:
a metal layer comprising
at least one track comprising marks, the marks providing information for reading by a detector external to the information carrier, and
the marks disposed within the at least one track,
wherein light emitted by light means as light used for detection impinges on the marks, the light emitted by light means having a central wavelength ($\lambda$), the light means comprising a light source incident at an angle ($\Theta_i$) upon the information carrier, and wherein the position of the information carrier can be derived from the position of the marks, wherein the marks comprise areas at least structured by first structures of a first lattice period ($\Lambda$), the first structures disposed on the back side of the metal layer and/or on the front side of the metal layer, wherein the lattice period ($\Lambda$) of the first structures satisfies the equation $\Lambda=\lambda/((n_p^*-\sin(\Theta_i))$ or $\Lambda=\lambda/(n_p^*+\sin(\Theta_i))$, where $\lambda$ is the central wavelength of the light emitted by light means, $\Theta_i$ is the angle of incidence on the information carrier of the light emitted by the light source, and $n_p^*$ is the effective index of a plasmon mode along the metal layer.

2. The information carrier according to claim 1, wherein the metal layer is disposed on a substrate.

3. The information carrier according to claim 2, further comprising a dielectric layer disposed on the metal layer.

4. The information carrier according to claim 3, wherein the dielectric layer comprises tantalum pentoxide, aluminum oxide, titanium oxide, hafnium oxide, polycarbonate or the material of the substrate.

5. The information carrier according to claim 2, further comprising an undercoating disposed between the substrate and the metal layer.

6. The information carrier according to claim 5, wherein the undercoating comprises titanium oxide or another material having low optical losses.

7. The information carrier according to claim 2, wherein the substrate is fabricated in an injection molding process.

8. The information carrier according to claim 1, wherein the angle ($\Theta_i$) is 0° and the lattice period ($\Lambda$) of the first structures thus satisfies the equation $\Lambda=\lambda/n_p^*$.

9. The information carrier according to claim 1, wherein the metal layer has a substantially homogeneous height (h).

10. The information carrier according to claim 1, wherein the first structures of the structured areas are sinusoidal.

11. The information carrier according to claim 1, wherein the central wavelength ($\lambda$) of the light emitted by the light source is about 890 nm.

12. The information carrier according to claim 1, wherein the first structures have a depth (d) below the lattice period ($\Lambda$), preferably about ⅕* $\Lambda$ to ⅛* $\Lambda$, preferably about 60 nm to 130 nm.

13. The information carrier according to claim 1, wherein the metal layer consists of a metal which has a low absorption in the wavelength range of the light emitted by the light source.

14. The information carrier according to claim 1, wherein the metal layer comprises a material selected from the group consisting of gold, silver, copper and aluminum.

15. The information carrier according to claim 1, wherein the metal layer has a height (h) approximately corresponding to the penetration depth of the plasmon wave, and the height is preferably about 20 to 60 nm.

16. The information carrier according to claim 1, wherein the back side of the information carrier has a polarizing lattice, the structures of the polarizing lattice correspond to the dimensions of the first structures and the structures of the polarizing lattice are arranged parallel relative to the first structures.

17. The information carrier according to claim 16, wherein the light is incident from the back side of the information carrier.

18. The information carrier according to claim 1, wherein second structures are arranged perpendicular to the first structures, and the second structures correspond to the dimensions of the first structures.

19. The information carrier according to claim 1, further comprising a plurality of non-structured areas, each non-structured area comprising an area adjacent to at least one mark, and without structures disposed thereon, wherein the non-structured areas absorb the incident light.

20. The information carrier according to claim 1, wherein the first structures are arranged parallel to each other in all marks of the information carrier.

21. The information carrier according to claim 1, wherein the information carrier is disposed in the shape of a disc and the track is disposed in a circular shape.

22. The information carrier according to claim 21, wherein the first structures are arranged substantially radial or substantially concentric in all marks of the information carrier, wherein the first structures within a mark are substantially parallel to each other.

23. A rotary encoder having a code disc, the code disc comprising the information carrier according to claim 1.

* * * * *